Nov. 16, 1926.

C. C. FAUVER 1,607,394

HEADLIGHT LENS

Filed July 8, 1925

INVENTOR
Charles C. Fauver
BY
Fred C. Matheny
ATTORNEY

Patented Nov. 16, 1926.

1,607,394

UNITED STATES PATENT OFFICE.

CHARLES C. FAUVER, OF SEATTLE, WASHINGTON.

HEADLIGHT LENS.

Application filed July 8, 1925. Serial No. 42,164.

My invention relates to improvements in headlight lenses for motor vehicles and the object of my invention is to provide a headlight lens that will eliminate the undesirable glare from motor vehicle headlights and that will direct the light outwardly and downwardly onto the road in front of a motor vehicle in a manner best calculated to efficiently illuminate the roadbed and make the driving of said vehicle safe and easy.

Another object of the invention is to provide a headlight lens having a plurality of vanes formed on the front side thereof for preventing the light from passing upwardly and for directing the light downwardly onto a roadbed in front of said lens, said vanes being arranged so that they prevent persons in front of a headlight on which said lens is installed from seeing the lamp bulb or reflector or experiencing the glare that is ordinarily produced by the headlight lamp and reflector.

Another object is to provide a headlight lens of one piece, integral construction embodying a lens portion having on its front side a plurality of normally transverse glass vanes which are thicker at the base and taper to thinner edges at the front and which are opaque or semi-opaque on one side and are inclined downwardly so that the front edge of the opaque portion of each vane lies in substantially the same horizontal plane as the opaque portion of the base of the next vane therebelow, said vanes being surrounded by an annular ring having an expanding inner wall and forming a light shield and a reinforcing member for the vanes, the ends of said vanes, having the same angle as said expanding inner wall surface and said vanes projecting forwardly and sidewise beyond said surrounding ring, said ring being narrow enough to permit light to pass out at the sides, and the corners of the vanes that project beyond the ring serving as a shield against upwardly directed rays of side light that would otherwise be especially annoying and dangerous when a motor vehicle is turning a corner.

Other and more specific objects will be apparent from the following description taken in connection with the accompanying drawings.

In the drawings Figure 1 is a view in front elevation of a headlight lens constructed in accordance with my invention.

Like reference numerals designate like parts throughout the several views.

My headlight lens comprises a substantially flat circular lens member 5 provided on its front side near the periphery with a concentrically arranged, forwardly projecting annular light shield 6 that extends continuously around that portion of said lens through which light is projected except that it is cut away as at 7 for a short distance at the bottom to better facilitate the shedding of light on the roadbed. The outer wall 8 of the light shield 6 is preferably cylindrical and at right angles to the lens member 5 while the inner wall 9 of said light shield 6 is inclined outwardly from the lens member toward the outer end of said light shield in the form of an expanding cone.

Figure 1:
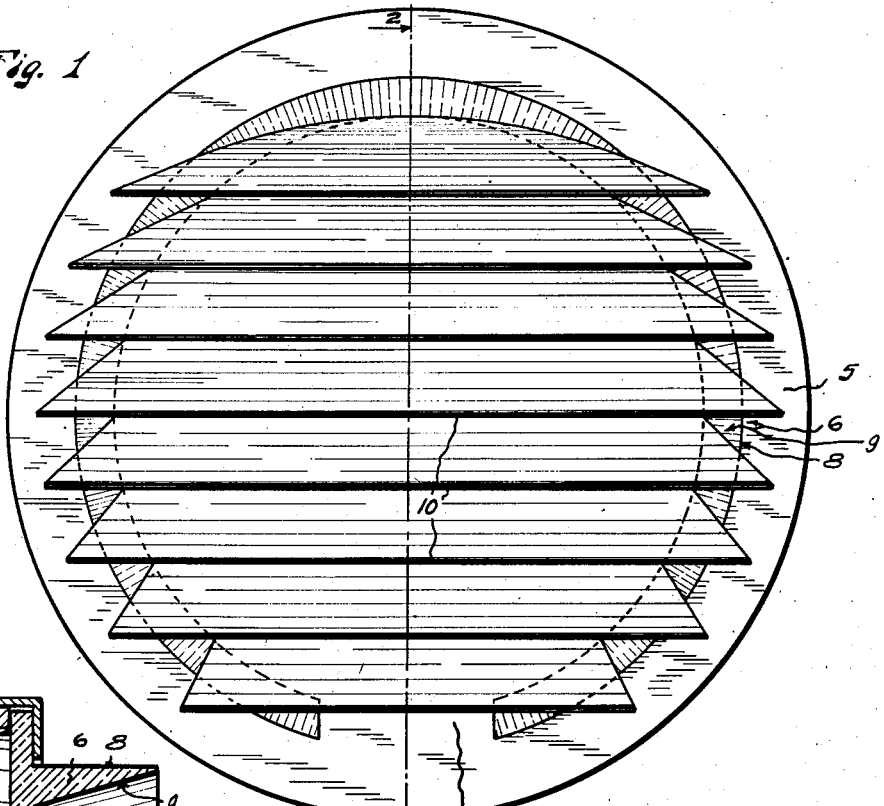
Figure 2:
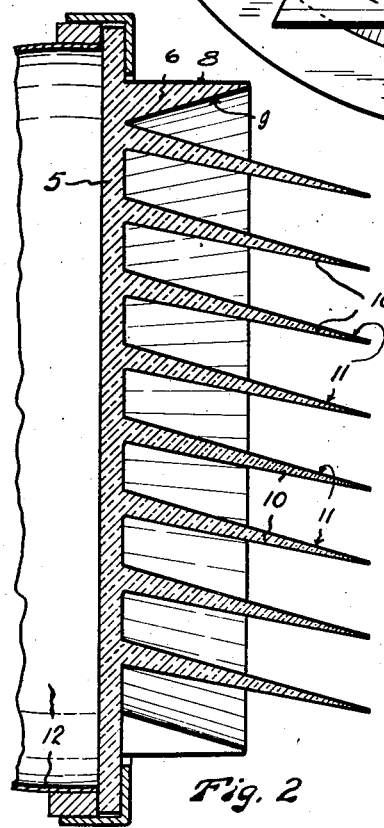
Fig. 2 is a sectional view of the same substantially on broken line 2—2 of Fig. 1 showing a fragment of a headlight reflector and retaining ring for the lens.
Figure 3:
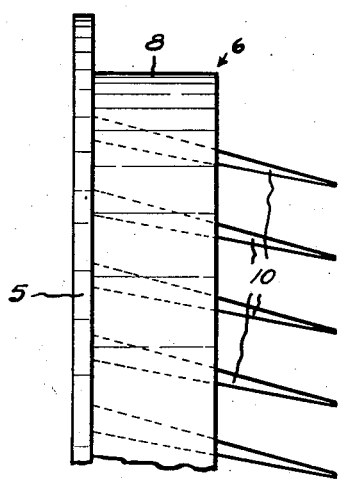
Fig. 3 is a fragmentary detached view in side elevation of the headlight lens.

A plurality of integral parallel spaced apart vanes 10 extend outwardly from the front side of the lens member 5 within the area enclosed by the light shield 6 and are all inclined in the same direction as shown in Figs. 2 and 3 so that the outer or front edge of each vane lies substantially in a plane that is normal to the lens portion 5 and that passes through the base of the vane next below. The vanes 10 are wider at the base and taper to a comparatively thin edge at the front and said vanes together with the lens 5 and light shield ring 6 are preferably all formed or molded in one piece.

The normal operative position of this headlight lens is with the vanes 10 horizontal and inclined downwardly, as in the drawings. The top surface of each vane 10 is provided with a coating 11 preferably semi-opaque, although it may be opaque if desired, that intercepts the glaring rays of light from the headlight lamp and reflector that would otherwise pass outwardly and upwardly to blind persons looking toward said lamps from the front, said coating rendering the vanes non-transparent.

The vanes 10 project outwardly further than the ring 6 and the edges of said vanes are projected forwardly in alignment with the bevel or incline of the ring 6 so that said edges extend sidewise beyond the circular central portion of the lens through which light is emitted to cooperate with the light shield ring 6 in eliminating glare from the sides of the lamp. The outer wall 8 and inner wall 9, of the light shield ring 6 and the outer flange of lens 5 will also preferably be coated with opaque of semi-opaque material to render said ring non-transparent.

When this lens is installed on a headlight lamp it will be apparent that some of the horizontal and most of the downwardly inclined rays of light from the lamp bulb or from the reflector may pass outward freely between the vanes 10 but that some of the horizontal rays of light and all rays that are inclined upwardly will strike the vanes 10 and be reflected downwardly or will be only partially transmitted by the opaque or semi-opaque upper surfaces 11 of said vanes.

Rays of light tending to pass outwardly and upwardly from the sides of the headlight will be intercepted by the light shield ring 6 and by the overhanging edges of the vanes thus eliminating glare from the sides.

In looking at a headlight equipped with this lens an observer in front of the same either on foot or in another vehicle will see the upper opaque or semi-opaque surfaces 11 of the vanes 10 and will not be blinded by the direct glare from the lamp bulb or reflector of said headlight.

The cutting away of the ring 6 at the bottom permits light to pass downwardly onto the roadbed directly in front of a vehicle on which the headlight is installed.

The foregoing description and accompanying drawings clearly disclose a preferred embodiment of my invention but it will be understood that this disclosure is merely illustrative and that such changes in the invention may be resorted to as are within the scope and spirit of the following claims.

I claim:

1. An integral headlight lens structure, embodying a relatively flat transparent lens portion, a circular light shield ring extending outwardly from the front side of said lens portion and having an expanding inner wall and a plurality of transversely arranged, spaced apart, downwardly inclined vanes extending across said lens portion within said light shield ring the edges of said vanes projecting beyond said ring at the sides and said vanes being treated to render said vanes non-transparent.

2. An integral headlight lens, embodying a relatively flat transparent lens portion, a circular non-transparent light shield ring extending outwardly from the front side of said lens wall, said ring having an expanding inner wall and having a portion thereof cut away to leave an opening at the bottom of said headlight lens and a plurality of normally horizontal spaced apart, downwardly inclined vanes extending across said lens within said light shield ring, the ends of said vanes projecting beyond said ring at the sides, the front edge of each of said vanes being substantially in a plane that is perpendicular to said flat lens portion and that passes through the base of the next adjacent vane therebelow, said vanes being thicker at their base and tapering to a thin front edge and the upper surface of said vanes being treated to render the same non-transparent.

The foregoing specification signed at Seattle, Washington, this 30th day of June, 1925.

CHARLES C. FAUVER.